United States Patent [19]

Zollner et al.

[11] 4,065,377

[45] Dec. 27, 1977

[54] METAL ANODE FOR ELECTROCHEMICAL PROCESSES

[75] Inventors: Christine Zöllner, Schwaig near Nurnberg; Gerhard Thiele, Uttenreuth uber Erlangen; Dieter Zöllner, Schwaig near Nurnberg; Konrad Koziol, Rothenbach an der Pegnitz, all of Germany

[73] Assignee: C. Conradty Nurnberg GmbH & Co. KG, Germany

[21] Appl. No.: 737,548

[22] Filed: Nov. 1, 1976

Related U.S. Application Data

[63] Continuation-in-part of Ser. No. 516,996, Oct. 22, 1974, Pat. No. 3,991,158.

[51] Int. Cl.$^2$ .................. C25B 11/04; C25D 17/00; C01G 15/00
[52] U.S. Cl. .................. 204/290 F; 204/98; 204/291

[58] Field of Search .................. 204/290 F, 291; 423/115, 593

[56] References Cited

U.S. PATENT DOCUMENTS

| | | | |
|---|---|---|---|
| 3,502,506 | 3/1970 | Broyde | 204/290 F |
| 3,560,144 | 2/1971 | Sleight | 423/593 |
| 3,992,280 | 11/1976 | Zollner et al. | 204/290 F |

FOREIGN PATENT DOCUMENTS 1,164,477  9/1969  United Kingdom ............ 204/290 F

*Primary Examiner*—F.C. Edmundson
*Attorney, Agent, or Firm*—Gifford, Chandler, Sheridan & Sprinkle

[57] ABSTRACT

An anode for electrochemical processes comprises a basis metal and a new electrochemical active substance for the cover layer, which substance is thallium palladate having the formula $TlPd_3O_4$.

5 Claims, No Drawings

METAL ANODE FOR ELECTROCHEMICAL PROCESSES

The present application is a continuation-in-part of our copending application, Serial No. 516,996 filed October 22, 1974 now U.S. Pat. No. 3,991,158.

BACKGROUND OF THE INVENTION

The present invention relates to a metal anode for electrochemical processes.

Certain patents and patent applications, e.g. German Democratic Republic Patent 55,323, German Democratic Republic Patent No. 77,963, German Published application No. 1,671,422, German Published application No. 1,917,040, German Published application No. 1,813,944, German Published application No. 1,962,860, and German Published application No. 2,200,500 disclose metal anodes containing cover layers of the most varying composition in order to eliminate the drawbacks of anode basis metals, particularly where the basis metal is a valve metal, such as titanium, tantalum, zirconium, niobium, etc.

However, most of the substances suggested for application as a cover layer, or as an essential component thereof, have unfortunately turned out to be disadvantageous because (a) their electrical conductivity and/or their chemical and electrochemical stability is not satisfactory or (b) a number of the suggested substances cannot at all or cannot very easily be applied to the anode carrier member without adversely affecting the requirements made respecting a cover layer.

DESCRIPTION OF THE INVENTION

It is therefore the object underlying the invention to provide a metal anode with a cover layer, which cover layer is characterized by a new electrochemical substance having an extraordinarily high electrochemical activity.

According to the invention the metal anode is provided with a cover layer of $TlPd_3O_4$. Although the basis metal of the anode can be any suitable metal the invention is particularly advantageous where the basis metal is a valve metal. The preparation of and identification of the $TlPd_3O_4$ is described in our copending patent application Ser. No. 516,996, filed October 10, 1974 now U.S. Pat. No. 3,991,158. This compound is readily soluble in constantly boiling hydrobromic acid (with some precipitation of TlBr), is moderately soluble in aqua regia and perchloric acid, is difficult to dissolve in sulphuric acid, nitric acid, formic acid and alkaline solvent. Above 750° C., $TlPd_3O_4$ is decomposed while forming elementary palladium and $Tl_2O_3$. The pycnometric density was found to be 8.99 g/cm$^3$. The radiographic evaluation for $TlPd_3O_4$ results in a cubic elementary cell:

| | | | |
|---|---|---|---|
| lattice constant | a | = | 9.596 ± 0.002 A |
| volume of the elementary cell | $V_{Ez}$ | = | 883.68 A$^3$ |
| number of formula units | Z | = | 8 |
| X-ray density | $S_{Ro}$ | = | 5.11 oz./cu.in. |

From the crystal lattice plane statistic the following extinction conditions resulted:

| hKl: | h + K | = | 2n−1 |
|---|---|---|---|
| | k + l | = | 2n−1 |
| | (h + l) | = | 2n−1 |

On the basis of these extinction conditions the space groups Fm3m-$O_h^5$, F432-$O^3$, F43m - $T_d^3$, Fm3 $T_h^3$ and F23- $T^2$ come into consideration for $TlPd_3O_4$.

The raster-electromicroscopic examination resulted in the presence of partially twinned octahedrones. Viewing the results in combination, they confirm the presence of the cubic face-centered structure.

If one now applies the $TlPd_3O_4$ to alloyed or unalloyed metal anode base member alone or together with co-adhesives the electrolysis of NaCl, KCl, chlorate, and HCl solutions can be conducted as well as other electrochemical processes.

Below is given an example for the preparation of $TlPd_3O_4$ as electrochemically active substance for electrochemical processes.

EXAMPLE 1 mol PdO is intimately mixed with 4 to 5 mol of $TlNO_3$ and is slowly heated to 500° – 600° C in sintered corundum trays. In this connection, by decomposition of the thallium nitrates above 300° C the cubic $Tl_2O_3$ results in jet-black crystals which react with PdO starting from 500° C. Excess $Tl_2O_3$ is removed by sublimation at 650° C; and palladium is removed by boiling with aqua regia. The cardinal-red reaction product according to guinea photos contains no further impurities.

The analyses of this compound is complicated insofar as $TlPd_3O_4$ is well soluble only in hydrobromic acid. However, the presence of bromide ions is disturbing in the course of the analyses by the formation of the TlBr, that is difficult to dissolve, and $PdBr_2$. Thus, it was necessary to boil the hydrobromic acid solution of the $TlPd_3O_4$ with a few drops of elementary bromine in order to bring the TlBr, which always precipitates in smaller amounts, in solution as $TlBr_3$; subsequently, to quantitatively expel bromine by boiling with concentrated $HNO_3$ and, since the oxidizing properties of the nitric acid also adversely affect the applied precipitation with organic reagents, to fume them off with sulphuric acid. The gravimetric determination of the thallium was conducted by precipitation with thionalide. Palladium is precipitated with dimethylglyoxime.

| $TlPd_3O_4$ Test Results | |
|---|---|
| Content of Tl | Content of Pd |
| 34.8% | 54.3% |
| 34.6% | 54.8% |
| 34.9% | 54.6% |
| 34.9% | 54.5% |

Tests have been conducted with different percentages of $TlPd_3O_4$ within the electrochemically active cover layer. Table 1 is illustrative of the typical results attained in such tests.

Table 1

| Percentage $TlPd_3O_4$ | Cell Voltage Volt | Oxygen $O_2$ within gaseous chlorine % volume | Hydrogen $H_2$ % volume | Cell Voltage at begin Volt |
|---|---|---|---|---|
| 20 | 4.10 – 4.27 | 0.15 – 0.20 | 0.15 – 0.25 | 4.10 – 4.15 |
| 40 | 4.10 – 4.23 | 0.15 – 0.20 | 0.10 – 0.20 | 4.10 – 4.15 |
| 70 | 4.10 – 4.20 | 0.10 – 0.15 | 0.10 – 0.20 | 4.10 – 4.12 |

The tests have been conducted under the following standard conditions.

Table 1-continued

| Electrolyte | 300 g NaCl/1000 cm$^3$ |
|---|---|
| pH-value | 3.0 to 4.0 |
| Temperature | 80° C |
| Current density i$_A$ | 10 kA/m$^2$ |
| Distance of the electrodes | 2 mm |

The values indicate that the electrochemical activity of the anode is increased in direction of a selective separation of chlorine by increasing the percentages of TlPd$_3$O$_4$ in the anode, and that the aging of the cover layer is decreased so that longer intervals of operation of the cells are possible. Because of the high currents used, a lowering of maximum cell voltage as little as 0.01 volt is economically significant. Although 20% TlPd$_3$O$_4$ makes a valuable contribution to the coating, it may be noted that 70% TlPd$_3$O$_4$ lowered the maximum initial voltage 0.03 volts and the maximum overall operating voltage 0.07 volts as compared to 20% TlPd$_3$O$_4$, for example.

Table 2

| Inlet of the Cell | | Outlet of the Cell | |
|---|---|---|---|
| | g | g | |
| Electrolyte: | 190 | 125 | NaCl/1000 cm$^3$ |
| Electrolyte: | 340 | 565 | NaClO$_3$/1000 cm$^3$ |
| Electrolyte: | 3 – 4 | 3 – 4 | Na$_2$Cr$_2$O$_7$/1000 cm$^3$ |
| pH-value : | 6.0 – 6.5 | | |
| Temperature: | 60° C | | |
| Current density i$_A$: | 2 – 5 kA/m$^2$ | | |

| Content TlPd$_3$O$_4$ % | Cell voltage characteristic Volt | Current yield % |
|---|---|---|
| 70 | $E_Z = 2.50 + 0.31 \cdot i_A$ | 94 – 96 |
| 50 | $E_Z = 2.55 + 0.31 \cdot i_A$ | 93 – 95 |
| 20 | $E_Z = 2.60 + 0.32 \cdot i_A$ | 94 – 96 |

A satisfactory electrochemical effectiveness is ensured already when 20% of TlPd$_3$O$_4$ are present in the cover layer. In permanent operation (10.000 A/m$^2$) a thus coated metal anode worked well over a period of time of 12 months without showing an alteration of the electrical properties as current yield, cell voltage, or electrochemical activity, such as chlorine deposition and resistance of the cover layer against wear.

It is, of course, to be understood that the present invention is, by no means, limited to the particular Example, but also comprises any modifications within the scope of the appended claims.

What is claimed is:

1. In an anode for electrochemical processes which anode comprises a basis metal and a cover layer, the improvement wherein said cover layer comprises cardinal-red cubic face centered thallium palladate having the formula TlPd$_3$O$_4$.

2. The anode as defined in claim 1 wherein said cover layer is comprised substantially entirely of said TlPd$_3$O$_4$.

3. The anode as defined in claim 1 wherein said cover layer comprises above about 70 percent of said TlPd$_3$O$_4$.

4. The anode as defined in claim 1 wherein said cover layer comprises above about 20 percent of said TlPd$_3$O$_4$.

5. The anode as defined in claim 1 wherein said basis metal is a valve metal.

* * * * *